United States Patent [19]
Abramovitz

[11] Patent Number: 5,128,789
[45] Date of Patent: Jul. 7, 1992

[54] NODE FOR GRID TYPE SINGLE MODE FIBER OPTIC LOCAL AREA NETWORK

[75] Inventor: Irwin J. Abramovitz, Baltimore, Md.

[73] Assignee: The United States of America as represented by the Secretary of the Air Force, Washington, D.C.

[21] Appl. No.: 673,224

[22] Filed: Mar. 6, 1991

[51] Int. Cl.$^5$ ........................ H04B 10/20; H04J 14/00
[52] U.S. Cl. .................... 359/118; 359/128; 359/139; 370/94.3; 370/60
[58] Field of Search ........... 370/94.3, 94.1, 60, 370/60.1; 359/117, 118, 119, 124, 136, 137, 139, 152, 123; 385/16, 17

[56] References Cited

U.S. PATENT DOCUMENTS

| | | | |
|---|---|---|---|
| 4,506,361 | 3/1985 | Kume | 370/94.1 |
| 4,650,278 | 3/1987 | Maciejko et al. | 350/96.20 |
| 4,708,424 | 11/1987 | Marhic | 350/96.16 |
| 4,736,359 | 4/1988 | Cohen et al. | 370/3 |
| 4,797,882 | 1/1989 | Maxemchuk | 370/60.1 |
| 4,805,234 | 2/1989 | Husbands | 455/607 |
| 4,850,042 | 7/1989 | Petronio et al. | 359/119 |
| 4,894,818 | 1/1990 | Fujioka et al. | 359/117 |
| 5,007,052 | 4/1991 | Flammer | 370/94.3 |

*Primary Examiner*—Edward L. Coles, Sr.
*Assistant Examiner*—Kinfe-Michael Negash
*Attorney, Agent, or Firm*—Robert L. Nathans; Donald J. Singer

[57] ABSTRACT

A controller at each node of a mesh type grid network of single mode optical fibers implements a switching algorithm which passes a given message to four neighboring nodes only once to avoid flooding the network. If a given wavelength is present on more than one input, the first to arrive is passed and the second to arrive is blocked. The network is configured to provide a large number of redundant paths, ensuring a high probability that a path will exist even in the face of significant network damage.

10 Claims, 2 Drawing Sheets

NODE FOR GRID TYPE SINGLE MODE FIBER OPTIC LOCAL AREA NETWORK

STATEMENT OF GOVERNMENT INTEREST

The invention described herein may be manufactured and used by or for the Government for governmental purposes without the payment of any royalty thereon.

BACKGROUND OF THE INVENTION

Single mode fiber optic local area networks employing star ring or bus structures cannot provide the redundancy required for reliable communications in a tactical military situation in which links are subject to damage from the movement of military equipment and vehicles as well as enemy action, and cannot provide the flexibility required for communications between frequently relocating units.

A simple two way grid, shown in FIG. 1, may be fabricated to cover, for example, a ten by ten kilometer area in which dispersed units will connect to the nearest mode each time they relocate. It would be desirable to provide a switching algorithm which would flood the network, providing a message to all nodes so that the system need not know at which node a particular unit is located. Thus, no configuration or reconfiguration following a units move is required. It would also be desirable to provide a grid network having a large number of redundant paths, ensuring a very high probability that a path will exist even in the face of significant network damage, where many links between nodes are severed.

BRIEF SUMMARY OF THE INVENTION

In accordance with the invention, a switching algorithm is provided that is based on information passing through the node. The switching algorithm operative at each node, accepts only one message at a time of a particular wavelength which is the first one received, and further retransmits the message to all neighboring nodes but only once. If such message is received a second time, it will be stopped. Such a message will have a finite lifetime within the network since after a given time it will of have reached all nodes, so that it will not be retransmitted thereafter. The network is thus purged of old messages so that the messages handled do not grow to a significantly large number.

BRIEF DESCRIPTION OF THE DRAWINGS

Other objects, features and advantages of the present invention will become apparent upon study of the following description, taken in conjunction with the drawings in which.

DETAILED DESCRIPTION OF A PREFERRED EMBODIMENT OF THE INVENTION

Figure 1:
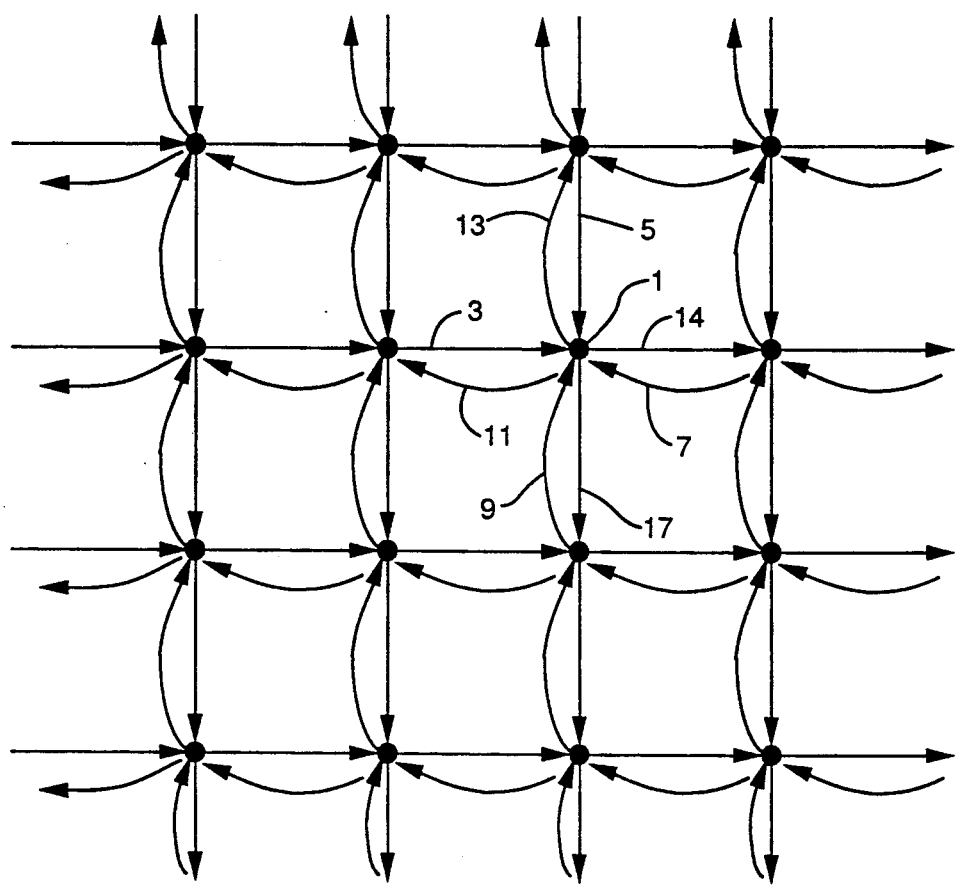
FIG. 1 discloses a two-way grid network configuration.

In FIG. 1, a particular node, or communication transceiver 1, is connected to four neighboring nodes via single mode optic fiber links comprising nodal interconnect means. Links 3,5,7, and 9 are incoming links to node 1, whereas links 11, 13, 14 and 17 are outgoing links to the four neighboring nodes which have the same components as node 1. Thus the network comprises rows and columns of single mode fiber-optic links having nodes at intersections of the links.

Figure 2:
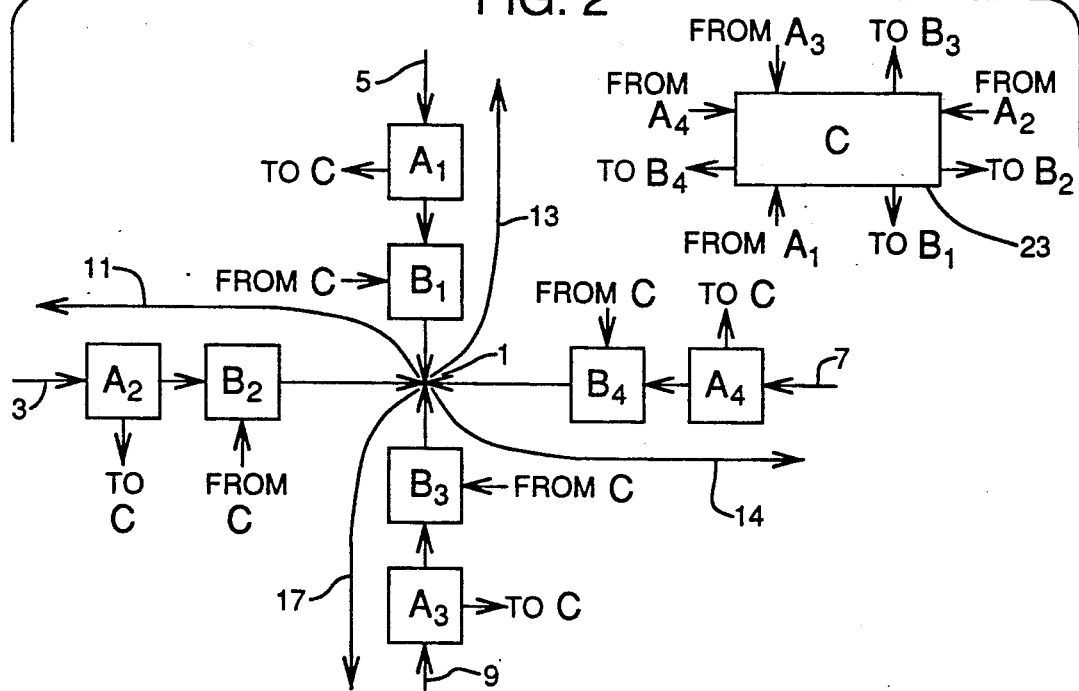
FIG. 2 schematically discloses a switching algorithm for carrying out the present invention.

In FIG. 2, the aforesaid incoming and outgoing links, together with node 1 are illustrated. Blocks A represent the step of determining the wavelength of a particular incoming message or data packet, and sending a wavelength indication signal to a common switching controller or control means 23. Blocks B represent the step of blocking incoming messages of a wavelength presently being processed by the node, and also stopping messages which have previously been transmitted through the node. Block C represents the common controller which keeps track of wavelengths in use and the message identification data of messages previously passed through the node. This data is then used by the controller to block the incoming messages having wavelengths which are currently being processed in the node and also for blocking old messages previously retransmitted through the node.

Figure 3:
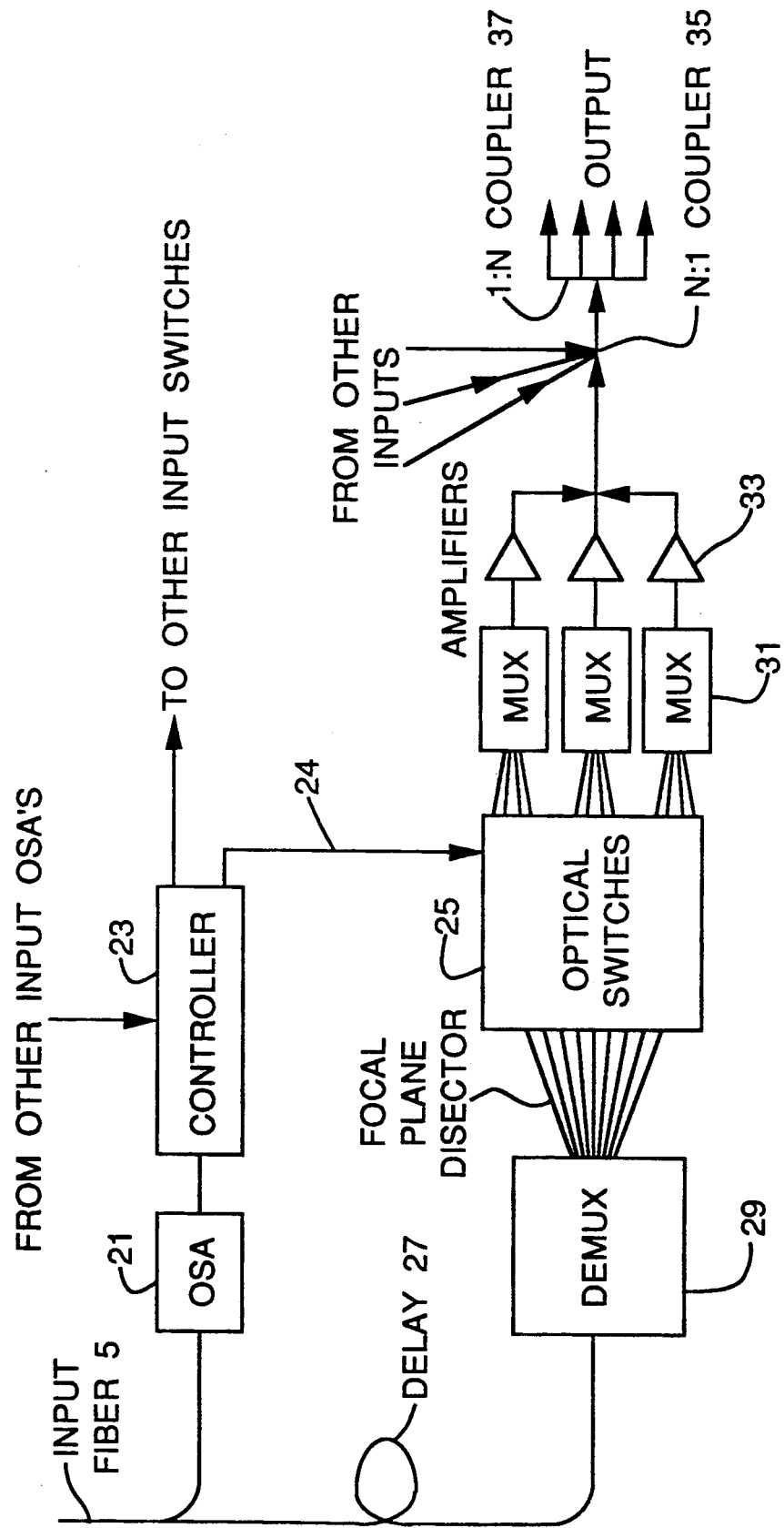
FIG. 3 discloses components of a single node of the present invention.

The nodal inter-connect design of FIG. 3 illustrates the common control means or controller 23 coupled to one bank of parallel optical switches 25, via 24, whereas the remaining three banks, not shown, control passage of signals applied via the remaining three input links 3,7, and 9. An optical spectrum or wavelength analyzer (OSA) 21 sends a signal to the common controller 23 indicative of the wavelength of the incoming signal in input link 5. If this wavelength is currently being processed by the node, an inhibit signal is sent to the particular switch handling the particular wavelength to block the incoming message, else the switch forwards the message to N:1 coupler 35 via multiplexers 31 and amplifiers 33. The message is delayed by delay fiber 27 to give the switch time to operate under the control of the common controller 23.

An angularly dispersive device 29 acts as a demultiplexer since it directs the optical incoming message signal at that particular switch in bank 25 assigned to the wavelength of the message currently being processed. If the incoming message satisfies the aforesaid conditions of the switching algorithm, it is passed by said particular switch through multiplexers 31, amplifiers 33 and N:1 coupler 35, which re-transmits or relays the message via 1:N coupler 37 to the four neighboring nodes shown in FIG. 1. In this example, N=four. There are three other sets of units 21, 25, 27, 29, 31 and 33 not shown, each associated with the remaining three incoming links 3, 7, and 9, shown in FIG. 1.

In the interests of brevity and economy, the details of the micro-processor controller program have been omitted. The creation of the program which merely keeps track of wavelengths in use, and message identification data of previously re-transmitted messages is well within the ordinary skill of the computer programmer. The nature of the message or data packet, with its header and identification data is disclosed in U.S. Pat. No. 4,797,882, to Maxemchuk. This patent, incorporated by reference herein also contains further details of a grid-based mesh network and components for processing the messages or data packets.

The nature of the parallel electro-optical switches 25 and the 1:N and N:1 couplers are also well known in the art. See for example, U.S. Pat. No. 4,521,069 to Ikeda. Likewise, the optical spectrum analyzer 21 and demultiplexer 29 could comprise an angularly dispersive device known in the art such as a grating. Focal plane disector technology may be used to fan out the demultiplexed signals inputted into the parallel switching array.

The focal plane disector technology may be used in reverse to bring together groups of channels after amplification by amplifiers 33 for multiplexing. These channels should be multiplexed into several groups of limited bandwidth (limited range of optical wavelength) since optical amplifiers 33 have limited gain-bandwidth products. Following amplification by amplifiers 33, the optical signals may be multiplexed into one full bandwidth fiber and summed with similar signals from the other inputs in N:1 coupler 35. The resulting combined input may then be split in 1:N coupler 37 and sent to the neighboring nodes. Although a discrete implementation is described above, several components may be combined in a monolithic unit.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A method of processing data packets within a grid-based mesh network having a plurality of particular nodes at the intersections of rows and columns of data transmission links which link the nodes together said method comprising the steps of:
    (a) determining if a particular incoming data packet has previously been re-transmitted through said particular node; and
    (b) blocking re-transmission of said particular data packet if said data packet has previously been re-transmitted through said particular node, and if not, re-transmitting said particular data packet to neighboring nodes.

2. The method of claim 1 including the step of storing identification data associated with particular messages transmitted through said particular node for future use in carrying out the performance of step (b).

3. The method of claim 1 wherein each particular node receives incoming data packets from other nodes and re-transmits said data packets to each of four neighboring nodes, but once and only once.

4. The method of claim 2 wherein each particular node receives incoming data packets from other nodes and re-transmits said data packets to each of four neighboring nodes, but once and only once.

5. A method of processing data packets within a grid-based mesh network having a plurality of particular nodes at the intersections of rows and columns of data transmission links which link the nodes together said method comprising the steps of:
    (a) identifying the wavelength of an incoming data packet incoming into a particular node and stopping further processing of said incoming data packet through said node if another data packet having said wavelength is currently being processed within said particular node;
    has previously
    (b) determining if a particular data packet been re-transmitted through said particular node; and
    (c) blocking re-transmission of said particular data packet if said data packet has previously been re-transmitted through said node, and if not, re-transmitting said particular data packet to neighboring nodes.

6. The method of claim 5 including the step of storing identification data associated with particular messages transmitted through said particular node for future use in carrying out the performance of step (b).

7. The method of claim 5 wherein each particular node receives incoming data packets from other nodes and re-transmits said data packets to each of four neighboring nodes, but once and only once.

8. The method of claim 6 wherein each particular node receives incoming data packets from other nodes and re-transmits said data packets to each of four neighboring nodes, but once and only once.

9. A system of processing data packets within a grid-based mesh network having a plurality of particular nodal interconnect means at the intersections of rows and columns of data transmission links, said nodal interconnect means comprising:
    (a) wavelength analyzer means for identifying the wavelength of a data packet incoming into said interconnect means and stopping further processing of said incoming data packet through said interconnect means if another data packet
    (b) control means for determining if said incoming data packet has previously been transmitted through said interconnect means; and
    (c) switching means controlled by said control means for blocking re-transmission of said incoming data packet if said data packet has previously been re-transmitted through said interconnect means, and if not, re-transmitted said incoming data packet to neighboring interconnect means at other transmission links.

10. The system of claim 9 wherein said data transmission links comprise single mode optical fibers and said switching means comprise networks of electro-optic switches for selectively transmitting or blocking light therethrough.

* * * * *

UNITED STATES PATENT AND TRADEMARK OFFICE
CERTIFICATE OF CORRECTION

PATENT NO. : 5,128,789
DATED : July 7, 1992
INVENTOR(S) : Irwin J. Abramovitz

It is certified that error appears in the above-indentified patent and that said Letters Patent is hereby corrected as shown below:

Column 4, Claim 5, line 9, before paragraph (b), "has previously" should be omitted.

Column 4, Claim 9, line 10, at the end of paragraph (a), following "data packet" the following should be inserted.

-- having said wavelength is currently being processed by said interconnect means;

Signed and Sealed this

Nineteenth Day of October, 1993

*Attest:*

BRUCE LEHMAN

*Attesting Officer*   Commissioner of Patents and Trademarks